DIRECT COUPLED TRANSISTOR LOGIC CIRCUIT INCLUDING INDIVIDUAL BASE BIASING NETWORKS
Filed April 27, 1965
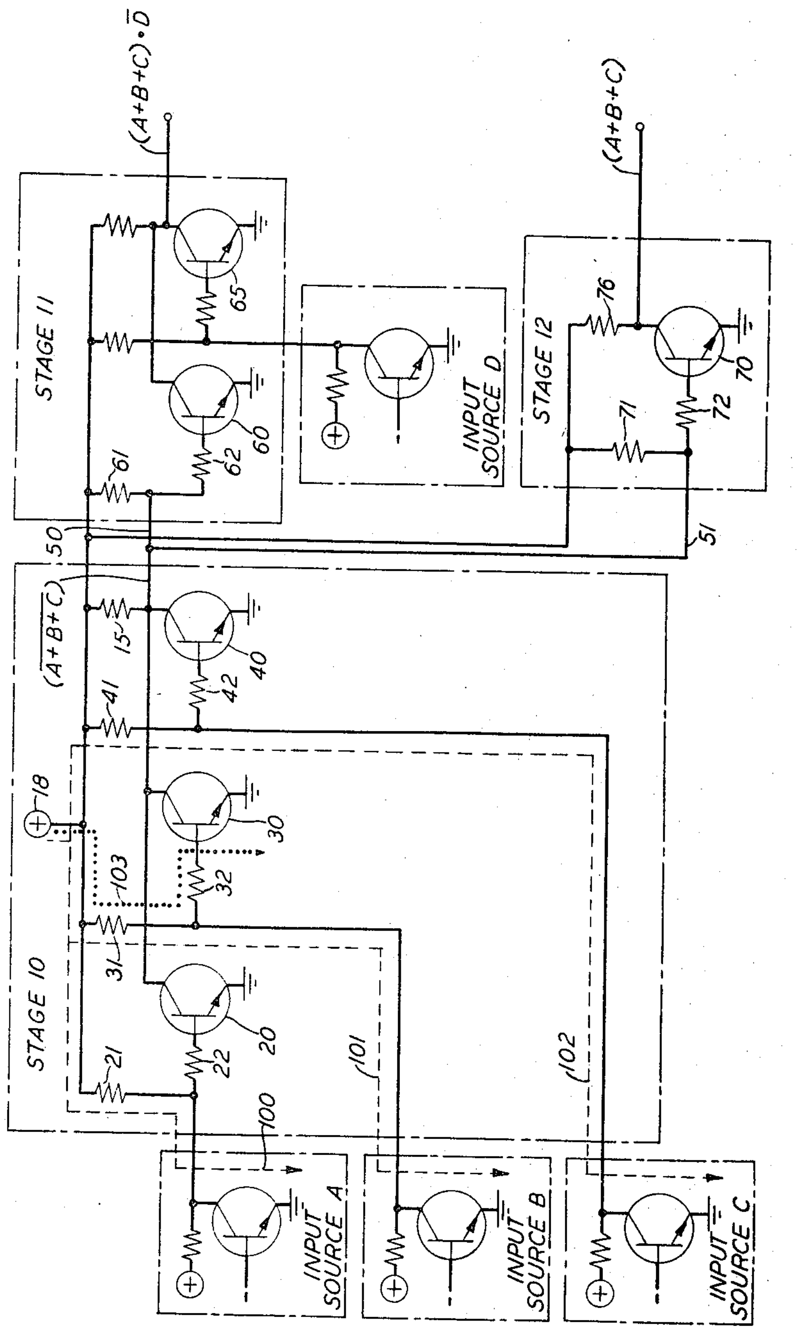
INVENTORS J. H. HUTTENHOFF
G. E. SALTUS
BY Lucian C. Canepa
ATTORNEY United States Patent Office 3,406,296

Patented Oct. 15, 1968

3,406,296

DIRECT COUPLED TRANSISTOR LOGIC CIRCUIT INCLUDING INDIVIDUAL BASE BIASING NETWORKS

John H. Huttenhoff, Succasunna, and George E. Saltus, Mendham, N.J., assignors to Bell Telephone Laboratories, Incorporated, New York, N.Y., a corporation of New York Filed Apr. 27, 1965, Ser. No. 451,281

2 Claims. (Cl. 307—215)

ABSTRACT OF THE DISCLOSURE

A direct coupled transistor logic stage designed as a basic building block for digital systems comprises a plurality of transistors each of which includes an individual base-biasing network. A logic array comprised of driving and driven stages of this type is relatively insensitive to variations in the fan-out characteristics of the array.

This invention relates to data processing circuits and, more specifically, to a semiconductor arrangement adapted for use as a basic building block for a digital logic system.

Many digital circuit combinations have heretofore been utilized in the electronics art to generate the various Boolean combinations of a set of binary input variables. One extensively employed such embodiment is a direct coupled transistor logic (DCTL) gate which is illustratively shown in FIG. 2–11 on page 36 of the "Switching Transistor Handbook," first edition, copyrighted in 1963 by Motorola, Inc. The DCTL logic stage there shown employs a plurality of grounded-emitter transistors having a common collector impedance, with the base terminals thereof being driven by independent binary signal sources. The common collector output impedance of each DCTL stage is directly connected as an input signal source to a variable number of following logic stages, with the particular number of such driven stages being designated the "fan-out" of the prior, driving stage. Correspondingly, the number of transistors included in any given stage is deemed the "fan-in" of that stage.

When all of the transistors included in a DCTL stage are simultaneously rendered nonconductive, a signal current flows through the stage output impedance to the input base-emitter junctions of the driven transistors, hence rendering these devices conductive. Hence, corresponding to a fan-out of $n$, $1/n$ of the signal current supplied by the driving stage is supplied to each following, driven transistor.

Where, as is the usual case, a variable fan-out is encountered, i.e., where different functionally adapted logic stages supply output signals to differing numbers of following, driven stages, several circuit problems, noted in part on pages 36 and 37 of the above-identified publication, are encountered. For example, it is apparent that the logic stages must be designed to drive the maximum possible fan-out which might be associated therewith, and to thereby supply a sufficient output signal current to turn on in a positive manner each of the corresponding maximum number of driven transistors. Accordingly, when a lesser fan-out is utilized, e.g., a fan-out of only one, the driven transistor is turned on by a heavy base current, and is driven deep into saturation. This results in a high stored charge and, accordingly, the associated storage time delay, i.e., the time required to terminate conduction in a transistor, is relatively long. Hence, the operative speed of the logic structure must be reduced to allow for such delays. In addition, digital pulse shrinkage effects are produced where a particular transistor is slowly turned on and rapidly turned off responsive to preceding high and low fan-out driving stages.

It is possible to partially compensate for the above-noted deleterious circuit effects by providing dummy loading for low fan-out stages to shunt a portion of the driving signal current away from the driven transistors, thereby avoiding the high stored charge in the driven stage(s). However, this expediency is limited to lumped circuit logic structures where loading resistors of the appropriate magnitudes may be physically attached to the appropriate logic stage terminals. Unfortunately, such dummy loading may not be employed when the logic stages are fabricated in integrated semiconductor form, or where multiple ones of such stages are included in a single encapsulating header. In these latter types of arrangements, the required electrical terminals are not available for the connection of loading resistors thereto.

It is therefore an object of the present invention to provide an improved digital logic circuit.

More specifically, an object of the present invention is the provision of a self-biasing DCTL gate which is operative at a relatively high rate of speed.

Another object of the present invention is the provision of a self-biasing DCTL gate which is relatively insensitive to the particular fan-out configuration associated therewith.

Still another object of the present invention is the provision of a self-biasing DCTL structure which may be fabricated by integrated semiconductor techniques.

These and other objects of the present invention are realized in a specific, illustrative, self-biasing DCTL circuit combination adapted for use as a basic digital system building block. Employed in an $n$-input self-biasing DCTL stage are $n$ normally conducting grounded-emitter transistors having the collector and base terminals thereof connected to a voltage source via a common collector load resistor, and by $n$ like base biasing networks each comprising two cascaded input resistors, respectively. The stage is driven by $n$ independent signal variables applied to the junction points between the serially-connected input resistors.

When all the transistors in a logic stage are coincidentally turned off responsive to an impressed set of input ground signals, a positive going output pulse is developed at the transistor collector terminals. Since each transistor is driven by its own associated base biasing elements, pulse shrinkage and transistor turn-on and turn-off problems normally associated with variable fan-in and fan-out logic structures are avoided. Also, the usual requirement for dummy loading low fan-out stages is vitiated, thereby facilitating the fabrication of integrated semiconductor circuits.

It is thus a feature of the present invention that a self-biasing DCTL stage include a plurality of transistors having their emitter terminals connected to ground and their collector terminals electrically interconnected, a like plurality of current biasing sources connected to the transistor base terminals, and input circuitry connected to said transistor base terminals for selectively diverting the current supplied by the current sources.

It is another feature of the present invention that a self-biasing DCTL stage include a plurality of transistors characterized by grounded emitter terminals and electrically-connected collector terminals, a voltage source, a resistor connecting the transistor collector terminals to the voltage source, and a plurality of resistive networks each connecting a different one of the transistor base terminals to the voltage source.

A complete understanding of the present invention and of the above and other features, advantages and variations thereof may be gained from a consideration of the following detailed description of an illustrative embodiment thereof presented hereinbelow in conjunction with the accompanying drawing which comprises a schematic diagram of a specific, illustrative digital logic structure made in accordance with the principles of the present invention.

Referring now to the drawing, there is shown a self-biasing DCTL logic stage 10 which includes three transistors 20, 30 and 40 each connected in a grounded-emitter configuration. The collector terminals of the transistors 20, 30 and 40 are electrically connected together and further joined by a common load resistor 15 to a positive voltage source 18. The source 18 is additionally connected to the base terminals of the transistors 20, 30 and 40 via three base biasing networks respectively comprising the cascaded resistors 21 and 22, 31 and 32, and 41 and 42.

The series resistance value characterizing each of the biasing networks 21 and 22, 31 and 32 and 41 and 42 is adapted to be sufficiently small to drive the associated transistors 20, 30 and 40 into a saturated condition in a relatively short period of time, but not so small as to develop an appreciable stored charge in a conducting transistor. Accordingly, the storage time delay exhibited by the devices 20, 30 and 40 is relatively small. Further, the resistors 22, 32 and 42 are utilized to mask the associated transistors 20, 30 or 40 input junction characteristic, thereby vitiating the DCTL "current hogging" problem noted in the above-identified Motorola Handbook.

Three independent input pulse sources A, B and C are respectively connected to the resistor junction points included in the base biasing networks connected to the transistors 20, 30 and 40, and are operative to selectively supply thereto either a relatively high positive potential, or a relatively low, approximately ground potential. The sources A, B and C are shown in the drawing as illustratively comprising the signal output elements included in logic stages similar to the hereinconsidered stage 10.

The common collector junction of the transistors 20, 30 and 40 is connected via two stage 10 output leads 50 and 51 to two following logic stages 11 and 12, and more particularly to two driven transistors 60 and 70 included therein. The stage 11 is shown as having a fan-in of two, with this stage further including a transistor 65 which is driven by an input signal source D. The stage 12 comprises a fan-in of 1, thereby functioning as a simple signal inverter. It is observed that since the output signals generated by the stage 10 are translated to two driven stages 11 and 12, the stage 10 is characterized by a fan-out of 2.

With the above-considered self-biasing DCTL structure in mind, a typical sequence of circuit operation therefor will now be described. In the discussion that follows, a relatively high positive voltage, and a relatively low, approximately ground potential are respectively deemed to correspond to binary "1" and "0" quantities. Initially, let each of the signal sources A, B and C supply a relatively low binary "0" output signal. Accordingly, biasing current supplied by the source 18 through the biasing resistors 21, 31 and 41 is diverted from the transistor 20, 30 and 40 base terminals to the near ground output potentials supplied by the corresponding sources A, B and C, as shown in the drawing by the dashed vectors 100, 101 and 102. Hence, each of the transistors 20, 30 and 40 is nonconductive, and a relatively high, binary "1" output signal is supplied by the source 18 and the load resistor 15 to the driven stages 11 and 12 via the stage 10 output leads 50 and 51.

Assume now, that one input source, e.g., the source B, supplies a relatively high, binary "1" output potential. Accordingly, biasing current flows from the source 18 through the biasing resistors 31 and 32 into the input base-emitter junction of the transistor 30, as illustrated in the drawing by the dotted vector 103. With the above conditions obtaining, the transistor 30 is saturated by the above-identified biasing current emanating from the source 18, Thus, the collector of the transistor 30 is characterized by a relatively low near ground potential at this time, and a binary "0" signal is translated to the driven stages 11 and 12 by the leads 50 and 51. As noted in detail hereinafter, the instant logic structure is arranged such that very little of the transistor 30 biasing current is supplied thereto by the binary "1" output signal from the source B, but that the great preponderance of this biasing current flows through the current path identified by the vector 103.

Treating the input sources A, C and C as supplying the Boolean variables A, B, and C, the stage 10 has thus been shown by the above to generate the combinatoric function $\overline{(A+B+C)}$, that is, to supply a relatively high binary "1" output signal only when A or B or C is not a "1." This is the so-called Peirce logic function, named after the American logician C. S. Peirce, and comprises a logical combination which is universal in the sense that it can be employed to generate any desired Boolean function. In this regard, see pages 54 et seq. of "Logical Design of Digital Computers" by M. Phister, Jr., copyrighted in 1958 by John Wiley & Sons, Inc. Thus, the instant self-biasing DCTL stage may advantageously be employed as a basic digital system building block, wherein any desired binary logic function can be fabricated by a proper combination of such stages.

By an analysis similar to the foregoing, the stage 11 and stage 12 embodiments may be shown to generate the Boolean output functions attributed thereto in the drawing.

It is noted at this point, that the resistance value characterizing the stage 10 output resistor 15 is made sufficiently large that relatively little signal current flows therethrough when the stage 10 is supplying a binary "1" output signal. Accordingly, in correspondence with the discussion hereinabove, when the driven stages 11 and 12 transistors 60 and 70 are turned on responsive to a stage 10 output binary "1" signal communicated thereto by the leads 50 and 51, most of the transistors 60 and 70 base energizing current is supplied thereto by the corresponding base biasing networks comprising resistors 61 and 62 and 71 and 72, respectively. In fact, the resistor 15 may be deleted entirely, and this circuit component is simply included in the illustrated embodiment to connect the stage 10 end of the interstage leads 50 and 51 to alternating current signal ground through a finite impedance at such times as none of the transistors 20, 30 or 40 is conducting. Such a finite impedance tends to reduce noise effects attributable to spurious signals induced in the conductors 50 and 51.

In general terms, as observed above, when any DCTL transistor resides in a conductive state, the principal part of its base driving current flows through the associated biasing network, and relatively little biasing current is supplied thereto by the associated driving stage. Hence, the instant self-biasing DCTL structure is not sensitive to varying fan-out conditions since, in every case, each conducting, driven transistor is energized by its own biasing network which has been predesigned to supply the optimal drive thereto. Accordingly, variable fan-out problems, along with the associated undesirable pulse shrinkage effects, are vitiated by the present arrangement. Moreover, the self-biasing feature avoids the above-discussed requirement for dummy loading, and hence the logic structure shown in the drawing may advantageously be embodied in integrated semiconductor form. Further, such an integrated structure is suitable for inclusion in an encapsulating header.

It is to be understood that the above-described arrangement is only illustrative of the application of the principles of the present invention. Numerous other arrangements may be devised by those skilled in the art without departing from the spirit and scope thereof.

What is claimed is:

1. In combination in a self-biasing direct coupled transistor logic stage, a plurality of transistors each including base, emitter and collector terminals, means directly connecting said emitter terminals to a point of reference potential, means directly connecting said collector terminals together, a voltage source, a relatively high impedance resistance element connected between said source and said collector terminals, an output terminal connected directly to said collector terminals, and a respective pair of series-connected resistance elements connected between said source and each different base terminal of said transistors, a point between the elements of each such pair constituting an input terminal for said stage, the values of the elements respectively connected between said input terminals and said source being characterized by impedances that are each low relative to the impedance of the element connected between said source and said collector terminals.

2. A logic array comprising a driving stages and at least one driven stage, each of said stages being identical in configuration to the stage defined by claim 1, said array comprising interconnection means directly connecting the output terminal of said driving stage to one of the input terminals of each of said driven stages, so that when all the transistors in said driving stage are de-energized a relatively small amount of driving current flows through said relatively high impedance element included in said driving stage and a relatively large amount of driving current flows through those series-connected elements in said driven stages that included an input terminal to which said interconnection means is connected, whereby the amount of driving current supplied to transistors in said driven stages is relatively independent of the number of transistors driven by said driving stage.

References Cited

UNITED STATES PATENTS

| | | | |
|---|---|---|---|
| 3,073,970 | 1/1963 | Bright. | |
| 3,283,180 | 11/1966 | Pressman ---------- | 307—88.5 |

OTHER REFERENCES

Motorola Switching Transistor Handbook, 1st ed., 1963 (pp. 36 and 37).

ARTHUR GAUSS, *Primary Examiner.*

D. D. FORRER, *Assistant Examiner.*